United States Patent Office 2,694,724
Patented Nov. 16, 1954

---

2,694,724

PROCESS FOR PREPARING CERTAIN DIALKYL-AMINOALKYL BICYCLIC CARBOXYLATES

Alan Bell and Wayne V. McConnell, Kingsport, Tenn., assignors to Eastman Kodak Company, Rochester, N. Y., a corporation of New Jersey No Drawing. Application April 8, 1952,
Serial No. 281,224

13 Claims. (Cl. 260—468)

This invention relates to an improved process for preparing dialkylaminoalkyl esters of a carboxylic acid having the formula:

I.  $\quad RR_1COOH$ wherein R represents a cyclohexyl radical and $R_1$ represents a cyclohexyl radical or a phenyl radical and wherein $R_1$ and the carboxyl group shown are directly joined to the same carbon atom of the cyclohexyl radical R. Both the radicals represented by R and $R_1$ may contain substituents such as an alkyl group, a hydroxy group or an alkoxy group.

It is an object of our invention to provide an improved process for preparing dialkylaminoalkyl esters of a bicyclohexyl-1-carboxylic acid. Another object of our invention is to provide an improved process for preparing dialkylaminoalkyl esters of a 1-phenylcyclohexyl-1-carboxylic acid. A specific object is to provide an improved process for preparing β-diethylaminoethyl bicyclohexyl-1-carboxylate.

We have discovered that the dialkylaminoalkyl esters of the aforesaid carboxylic acids can be prepared directly from a ketone having the formula:

II.
$$R-\underset{\underset{O}{\|}}{C}-R_1$$

wherein R and $R_1$ have the meaning previously assigned to them and X represents a chlorine atom or a bromine atom and wherein X and the $$-\underset{\underset{O}{\|}}{C}-R_1$$

grouping are directly attached to the same carbon atom of the cyclohexyl radical R by reacting it (the ketone) with a sodium, potassium- or lithium dialkylaminoalkylate.

For purposes of clarity it is here noted that the reaction between 1-chlorocyclohexyl cyclohexyl ketone and sodium β-diethylaminoethylate is believed to take place in accordance with the following equation:

[Reaction scheme: 1-chlorocyclohexyl cyclohexyl ketone + NaOCH$_2$CH$_2$N(C$_2$H$_5$)$_2$ (sodium β-diethylaminoethylate) → β-diethylaminoethyl-bicyclohexyl-1-carboxylate + NaCl]

The dialkylaminoalkylates employed in the new process of our invention ordinarily have the formula:

$$\underset{Y}{\overset{X}{\diagdown}}N-(CH_2)_n-O-M$$

wherein X and Y each represents an alkyl group having one to four, inclusive, carbon atoms, M represents sodium, potassium or lithium and n is 2, 3 or 4.

Illustrative of the dialkylaminoalkyl alcohols used in preparing the sodium-, potassium- or lithium dialkylaminoalkylates employed in carrying out the process of our invention are:

β-Dimethylaminoethanol, (CH$_3$)$_2$NCH$_2$CH$_2$OH
β-Diethylaminoethanol, (C$_2$H$_5$)$_2$NCH$_2$CH$_2$OH
β-Di(n-propyl)aminoethanol, (n-C$_3$H$_7$)$_2$NCH$_2$CH$_2$OH β-Diisopropylaminoethanol, $\left(\begin{array}{c}CH_3\\ \diagdown\\ CH\\ \diagup\\ CH_3\end{array}\right)_2 NCH_2CH_2OH$ β-Di(n-butyl)aminoethanol, (n-C$_4$H$_9$)$_2$NCH$_2$CH$_2$OH
γ-Dimethylaminopropanol, (CH$_3$)$_2$NCH$_2$CH$_2$CH$_2$OH
γ-Diethylaminopropanol, (C$_2$H$_5$)$_2$NCH$_2$CH$_2$CH$_2$OH
γ-Di(n-butyl)aminopropanol, (n-C$_4$H$_9$)$_2$NCH$_2$CH$_2$CH$_2$OH
δ-Dimethylaminobutanol, (CH$_3$)$_2$NCH$_2$CH$_2$CH$_2$CH$_2$OH
δ-Diethylaminobutanol, (C$_2$H$_5$)$_2$NCH$_2$CH$_2$CH$_2$CH$_2$OH
δ-Di(n-butyl)aminobutanol, (n-C$_4$H$_9$)$_2$NCH$_2$CH$_2$CH$_2$CH$_2$OH 1-chlorocyclohexyl cyclohexyl ketone, 1-bromocyclohexyl cyclohexyl ketone, phenyl 1-chlorocyclohexyl ketone, phenyl 1-bromocyclohexyl ketone, phenyl 1-chloro-2-methylcyclohexyl ketone, p-methoxyphenyl 1-chlorocyclohexyl ketone, p-ethoxyphenyl 1-bromocyclohexyl ketone, phenyl 1-chloro-3-methoxycyclohexyl ketone and phenyl 1-bromo-3-ethoxycyclohexyl ketone are illustrative of the ketone compounds used in carrying out the process of our invention.

The ester compounds prepared in accordance with the new process of our invention may be prepared in their free base form or in their acid addition salt form. Ordinarily they are used in their hydrochloride salt form. However, as understood by those skilled in the art, other salt forms such as the phosphate, sulfate, tartrate, etc. may be readily prepared, as by neutralization of the free base with the selected acid. The salt forms are readily converted to the free base by treatment with an alkali such as sodium carbonate.

The following description and examples illustrate the process of our invention. Parts are expressed as parts by weight.

EXAMPLE A

*Reaction of 1-chlorocyclohexyl cyclohexyl ketone with sodium β-diethylaminoethylate in β-diethylaminoethyl alcohol solution*

1 part of sodium was added portionwise, with stirring, to 15 parts of β-diethylaminoethyl alcohol. (If necessary, the reaction mixture is heated, for example, to 70° C.–90° C. to make certain that all the sodium has reacted). After the sodium had completely reacted with the β-diethylaminoethyl alcohol, varying amounts (see Table I) of 1-chlorocyclohexyl cyclohexyl ketone were added to the stirred reaction mixture and the reaction was allowed to proceed at the temperature set forth in Table I. Upon completion of the reaction, the reaction mixture was poured into water and the resulting reaction mixture was extracted with ethyl ether. The ether extract was washed with water until the excess β-diethylaminoethyl alcohol was removed and then dried by the use of a drying agent such as calcium chloride. Then sufficient anhydrous hydrogen chloride dissolved in methyl alcohol was added to the dried ethereal solution to precipitate the hydrochloride of β-diethylaminoethyl bicyclohexyl-1-carboxylate. The reaction product thus formed was recovered by filtration, washed with ethyl ether and dried (for example, at 50° C. in a vacuum oven).

TABLE I

| Ex. No. | Parts of 1-Chlorocyclohexyl Cyclohexyl Ketone | Reaction Temperature, Degrees C. | Reaction Time in Hours | Percent Conversion to Hydrochloride of β-Diethylamino-ethyl 1-Bicyclohexyl-1-Carboxylate |
| --- | --- | --- | --- | --- |
| 1 | 9.93 | 30 | 17 | 23 |
| 2 | 4.97 | 30 | 24 | 37 |
| 3 | 9.93 | 80-100 | 17 | 28 |
| 4 | 6.62 | 80-100 | 1 | 46 |
| 5 | 6.62 | 80-100 | 2 | 49 |
| 6 | 6.62 | 80-100 | 16 | 46 |
| 7 | 4.97 | 80-100 | 15 | 38 |
| 8 | 9.93 | 160 | 0.5 | 23 |
| 9 | 4.97 | 160 | 0.5 | 21 |

The number of moles of sodium β-diethylaminoethylate per mole of 1-chlorocyclohexyl cyclohexyl ketone in Examples 1 to 9, is as follows:

| Example No. | 1 | 2 | 3 | 4 | 5 | 6 | 7 | 8 | 9 |
| --- | --- | --- | --- | --- | --- | --- | --- | --- | --- |
| Moles of Sodium β-Diethylaminoethylate per Mole of 1-Chlorocyclohexyl Cyclohexyl Ketone | 1 | 2 | 1 | 1.5 | 1.5 | 1.5 | 2 | 1 | 2 |

EXAMPLE 10

15 parts of potassium were added portionwise, with stirring, to 140 parts of β-diethylaminoethyl alcohol. After the potassium had completely reacted with the β-diethylaminoethyl alcohol, 39 parts of 1-chlorocyclohexyl cyclohexyl ketone were added to the reaction mixture and the resulting reaction mixture was stirred and heated at 80° C. for 3½ hours. The reaction mixture was then worked up in accordance with the general procedure described in Example A. 19 parts (32% of theory) of the hydrochloride of β-diethylaminoethyl bicyclohexyl-1-carboxylate were obtained. In this example the mole ratio of the potassium β-diethylaminoethylate to the 1-chlorocyclohexyl cyclohexyl ketone was about 2.25 to 1.

EXAMPLE 11

5 grams (0.22 gram atoms) of sodium were added portionwise, with stirring, to 70 grams (0.6 gram mole) of β-diethylaminoethyl alcohol. (If necessary, the reaction mixture is heated, for example, to 70° C.–90° C. to make certain that all the sodium has reacted.) After the sodium had completely reacted, the temperature of the solution thus obtained was adjusted to 60° C. and 23 grams (0.1 gram mole) of 1-chlorocyclohexyl cyclohexyl ketone were added thereto over a period of 3 to 5 minutes, while stirring vigorously. The temperature of the reaction mixture rose to 90° C.–95° C. Following the addition of the 1-chlorocyclohexyl cyclohexyl ketone, the reaction mixture was stirred and heated at 80° C.–100° C. for 2 hours. (If desired, the excess β-diethylaminoethyl alcohol can be recovered by distillation under reduced pressure at this point, although it was not done so in this example). The reaction mixture was allowed to cool and 200 ccs. of water were added thereto. The resulting reaction mixture was extracted with two 200 cc. portions of ethyl ether. The aqueous extract was acidified with hydrochloric acid and 3.7 grams (17.6% conversion) of crude bicyclohexyl-1-carboxylic acid separated and was recovered by filtration. The ether extracts were combined and washed with water until most of the excess β-diethylaminoethyl alcohol was removed. The ether solution thus obtained was then dried over calcium chloride. A mixture of 8 ccs. of methyl alcohol and 3 grams of anhydrous hydrogen chloride was added to the dry ethereal solution to precipitate the hydrochloride of β-diethylaminoethyl bicyclohexyl-1-carboxylate. The reaction product was recovered by filtration, washed first with ethyl ether, then with acetone if an appreciable amount of color is present, and dried at 50° C. in a vacuum oven. 13 grams (38% of theory) of the hydrochloride of β-diethylaminoethyl bicyclohexyl-1-carboxylate were obtained.

EXAMPLE 12

Two and one-tenth parts of lithium were added portionwise to 105 parts of β-diethylaminoethyl alcohol while maintaining a temperature of about 100° C. After the lithium had reacted completely with the alcohol, 46 parts of 1-chlorocyclohexyl cyclohexyl ketone were added and the reaction mixture was stirred and heated at 100° C. for 3 hours. The reaction mixture was then worked up as described in the general procedure in Example A. Thirty-one parts (45% of theory) of the hydrochloride of β-diethylaminoethyl bicyclohexyl-1-carboxylate were obtained. In this reaction the mole ratio of lithium β-diethylaminoethylate to 1-chlorocyclohexyl cyclohexyl ketone was about 1.5 to 1.

Following the procedure described hereinbefore in connection with the preparation of β-diethylaminoethyl bicyclohexyl-1-carboxylate, the following compounds are readily prepared:

(13) β-Dimethylaminoethyl bicyclohexyl-1-carboxylate
(14) β-Di(n-propyl)aminoethyl bicyclohexyl-1-carboxylate
(15) β-Diisopropylaminoethyl bicyclohexyl-1-carboxylate
(16) β-Di(n-butyl)aminoethyl bicyclohexyl-1-carboxylate
(17) γ-Dimethylaminopropyl bicyclohexyl-1-carboxylate
(18) γ-Diethylaminopropyl bicyclohexyl-1-carboxylate
(19) γ-Di(n-propyl)aminopropyl bicyclohexyl-1-carboxylate
(20) δ-Dimethylaminobutyl bicyclohexyl-1-carboxylate
(21) δ-Diethylaminobutyl bicyclohexyl-1-carboxylate
(22) δ-Di(n-butyl)aminobutyl bicyclohexyl-1-carboxylate
(23) β-Dimethylaminoethyl 1-phenylcyclohexyl-1-carboxylate
(24) β-Diethylaminoethyl 1-phenylcyclohexyl-1-carboxylate
(25) β-Di(n-propyl)aminoethyl 1-phenylcyclohexyl-1-carboxylate
(26) β-Di(n-butyl)aminoethyl 1-phenylcyclohexyl-1-carboxylate
(27) γ-Dimethylaminopropyl 1-phenylcyclohexyl-1-carboxylate
(28) γ-Diethylaminopropyl 1-phenylcyclohexyl-1-carboxylate
(29) γ-Di(n-butyl)aminopropyl 1-phenylcyclohexyl-1-carboxylate
(30) δ-Dimethylaminobutyl 1-phenylcyclohexyl-1-carboxylate
(31) δ-Diethylaminobutyl 1-phenylcyclohexyl-1-carboxylate
(32) δ-Di(n-propyl)aminobutyl 1-phenylcyclohexyl-1-carboxylate
(33) δ-Di(n-butyl)aminobutyl 1-phenylcyclohexyl-1-carboxylate While our invention has been illustrated primarily with reference to the use of the sodium form of the dialkylaminoalkylate the use of the potassium or lithium form gives generally similar results. Similarly the bromo form of the ketone intermediate compounds can be used rather than the chloro form.

In the examples given herein ethyl ether was the inert solvent used to extract the reaction product from the reaction mixture and to wash the hydrochloride salt form of the desired compound. Inert solvents, other than ethyl ether, which have been used for these purposes, include isopropyl ether, toluene and chlorinated hydrocarbons such as ethylene chloride and carbon tetrachloride. Where a solvent such as toluene or a chlorinated hydrocarbon is used, the use of calcium chloride can be eliminated and the solvent solution dried azeotropically.

It is here noted that while the use of anhydrous hydrogen chloride dissolved in methyl alcohol to effect precipitation of the hydrochloride salt form of the reaction product is disclosed, for example, in Example A it is not necessary to use methyl alcohol. The anhydrous hydrogen chloride can be introduced directly into the solvent solution.

In Examples A and 11, for example, metallic sodium was used to prepare the sodium salt of the dialkylaminoalkylate employed. The equivalent amount of sodium hydroxide may be used also. In this case a mixture of powdered or flake sodium hydroxide, dialkylaminoalkanol and toluene is heated. The water formed is azeotropically removed through a fractionating column. After all the water has been removed, the chloro- or bromoketone (Chloroketone in Examples A and 11) compound is added and the reaction is continued in accordance with the procedure described.

The use of a reaction temperature of about 80° C. to about 100° C. and of sodium-, potassium- or lithium dialkylaminoethylate and the bromo- or chloroketone compound in the ratio of about 1.5 moles of the former to one mole of the latter appears to be advantageous.

If desired, a substantial portion of the β-diethylaminoethyl alcohol used in Examples 1 to 11, inclusive, can be replaced by an inert solvent such as isopropyl ether or toluene.

Where it is desired to obtain the final product in a better physical state and somewhat purer chemically, this can be accomplished by recrystallizing the product from a suitable solvent. The procedure is illustrated hereinafter in connection with the hydrochloride of β-diethylaminoethyl bicyclohexyl-1-carboxylate.

EXAMPLE B 47 grams of hydrochloride of β-diethylaminoethyl bicyclohexyl-1-carboxylate were dissolved in 100 ccs. of boiling ethylene dichloride and allowed to crystallize therefrom. (If extraneous solids are present, the solution should be filtered while hot.) The mixture was finally cooled in an ice bath for 30 minutes and then filtered. The hydrochloride of β-diethylaminoethyl bicyclohexyl-1-carboxylate recovered on the filter was washed with acetone and dried at 50° C. in a vacuum oven. 37.5 grams (79.5% recovery) of the starting product were obtained from the first crop. An additional 5 to 10% of a satisfactory product can be crystallized by evaporating a portion of the solvent from the mother liquor. The filtrate from the final crystallization was then evaporated to dryness to recover the remaining crude hydrochloride of β-diethylaminoethyl bicyclohexyl-1-carboxylate which can be purified by further crystallization from ethylene dichloride in accordance with the procedure just described.

The recrystallization procedure described in Example B is only one of many procedures that can be used. Other solvents which give satisfactory results are water, dilute aqueous hydrochloric acid, toluene or a mixture of solvents such as methyl alcohol-acetone, toluene-ethyl alcohol and n-butyl ether-methyl alcohol. A very acceptable procedure in the case of the compound of Example B is to dissolve two parts of the compound in three parts of hot water. Purification procedures are well known to those skilled in the art and various other suitable procedures can be employed.

The products made in accordance with the improved process of our invention exhibit valuable pharmacological properties, in particular, having pronounced antispasmodic action on normal smooth muscle. In addition, most of the products possess definite sedative action. The products also have usefulness as analgesics.

The pharmacological properties of the hydrochloride of β-diethylaminoethyl bicyclohexyl-1-carboxylate are discussed in Journal American Pharmaceutical Association, volume 39, pages 305–311 (1950).

We claim:
1. The process for preparing a dialkylaminoalkyl ester of a carboxylic acid selected from the group consisting of a bicyclohexyl-1-carboxylic acid and a 1-phenylcyclohexyl-1-carboxylic acid which comprises reacting a ketone selected from the group consisting of a 1-chlorocyclohexyl cyclohexylketone, a 1-bromocyclohexyl cyclohexyl ketone, a phenyl 1-chlorocyclohexyl ketone and a phenyl 1-bromocyclohexyl ketone with an alkali metal, said alkali metal having an atomic weight between 6 and 40, dialkylaminoalkylate.

2. The process for preparing a dialkylaminoalkyl ester of a bicyclohexyl-1-carboxylic acid which comprises reacting a 1-halogencyclohexyl cyclohexyl ketone, said halogen atom having an atomic weight between 35 and 80, with a dialkylaminoalkylate having the formula:

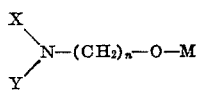

wherein X and Y each represents an alkyl group having 1 to 4, inclusive, carbon atoms, M represents an alkali metal having an atomic weight between 6 and 40 and $n$ is a whole number from 2 to 4, inclusive.

3. The process for preparing a dialkylaminoalkyl ester of a 1-phenylcyclohexyl-1-carboxylic acid which comprises reacting a phenyl 1-halogencyclohexyl ketone, said halogen atom having an atomic weight between 35 and 80, with a dialkylaminoalkylate having the formula:

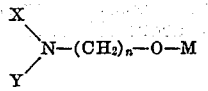

wherein X and Y each represents an alkyl group having 1 to 4, inclusive, carbon atoms, M represents an alkali metal having an atomic weight between 6 and 40 and $n$ is a whole number from 2 to 4, inclusive.

4. The process for preparing a dialkylaminoalkyl ester of bicyclohexyl-1-carboxylic acid which comprises reacting 1-halogencyclohexyl cyclohexyl ketone, said halogen atom having an atomic weight between 35 and 80, with a dialkylaminoalkylate having the formula:

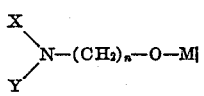

wherein X and Y each represents an alkyl group having 1 to 4, inclusive, carbon atoms, M represents an alkali metal having an atomic weight between 6 and 40 and $n$ is a whole number from 2 to 4, inclusive.

5. The process for preparing a dialkylaminoalkyl ester of 1-phenylcyclohexyl-1-carboxylic acid which comprises reacting phenyl 1-halogencyclohexyl ketone, said halogen atom having an atomic weight between 35 and 80, with a dialkylaminoalkylate having the formula:

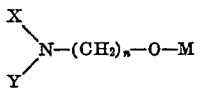

wherein X and Y each represents an alkyl group having 1 to 4, inclusive, carbon atoms, M represents an alkali metal having an atomic weight between 6 and 40 and $n$ is a whole number from 2 to 4, inclusive.

6. The process for preparing β-diethylaminoethyl bicyclohexyl-1-carboxylate which comprises reacting 1-halogencyclohexyl cyclohexyl ketone, said halgen atom having an atomic weight between 35 and 80, with an alkali metal, said alkali metal having an atomic weight between 6 and 40, β-diethylaminoethylate 7. The process for preparing β-diethylaminoethyl bicyclohexyl-1-carboxylate which comprises reacting 1-chlorocyclohexyl cyclohexyl ketone with sodium β-diethylaminoethylate.

8. The process for preparing β-diethylaminoethyl bicyclohexyl-1-carboxylate which comprises reacting 1-chlorocyclohexyl cyclohexyl ketone with potassium β-diethylaminoethylate.

9. The process for preparing β-diethylaminoethyl bicyclohexyl-1-carboxylate which comprises reacting 1-chlorocyclohexyl cyclohexyl ketone with lithium β-diethylaminoethylate.

10. The process for preparing β-diethylaminoethyl bicyclohexyl-1-carboxylate which comprises reacting 1-halogencyclohexyl cyclohexyl ketone, said halogen atom having an atomic weight between 35 and 80, with an alkali metal, said alkali metal having an atomic weight between 6 and 40, β-diethylaminoethylate, in the ratio of about 1 gram mole of the 1-halogencyclohexyl cyclohexyl ketone to 1.5 gram moles of the alkali metal β-diethylaminoethylate for about 1 to 16 hours at a temperature of about 80° C. to 100° C.

11. The process for preparing β-diethylaminoethyl bicyclohexyl-1-carboxylate which comprises reacting 1-halogencyclohexyl cyclohexyl ketone, said halogen atom having an atomic weight between 35 and 80, with an alkali metal, said alkali metal having an atomic weight between 6 and 40, β-diethylaminoethylate, in the ratio of about 1 gram mole of the 1-halogencyclohexyl cyclohexyl ketone to 1.5 gram moles of the alkali metal β-diethylaminoethylate for about 1 to 2 hours at a temperature of about 80° C. to 100° C.

12. The process for preparing β-diethylaminoethyl bicyclohexyl-1-carboxylate which comprises heating 1-chlorocyclohexyl cyclohexyl ketone with sodium β-diethylaminoethylate in the ratio of about 1 gram mole of 1-chlorocyclohexyl cyclohexyl ketone to 1.5 gram moles of sodium β-diethylaminoethylate for about 1 to 16 hours at a temperature of about 80° C. to 100° C.

13. The process for preparing β-diethylaminoethyl bicyclohexyl-1-carboxylate which comprises heating 1-chlorocyclohexyl cyclohexyl ketone with sodium β-diethylaminoethylate in the ratio of about 1 gram mole of 1-chlorocyclohexyl cyclohexyl ketone to 1.5 gram moles of sodium β-diethylaminoethylate for about 1 to 2 hours at a temperature of about 80° C. to 100° C.

No references cited.